July 13, 1937. F. J. T. BARNES 2,086,519
VARIABLE HYDRAULIC POWER TRANSMISSION DEVICE
Filed June 22, 1933 2 Sheets-Sheet 2
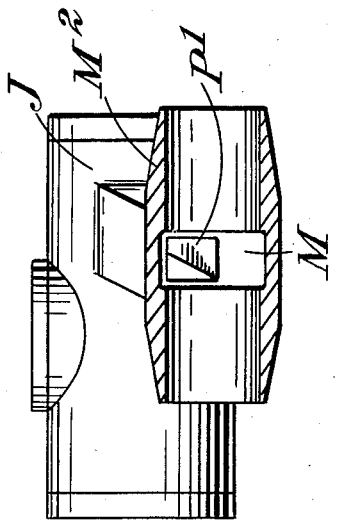
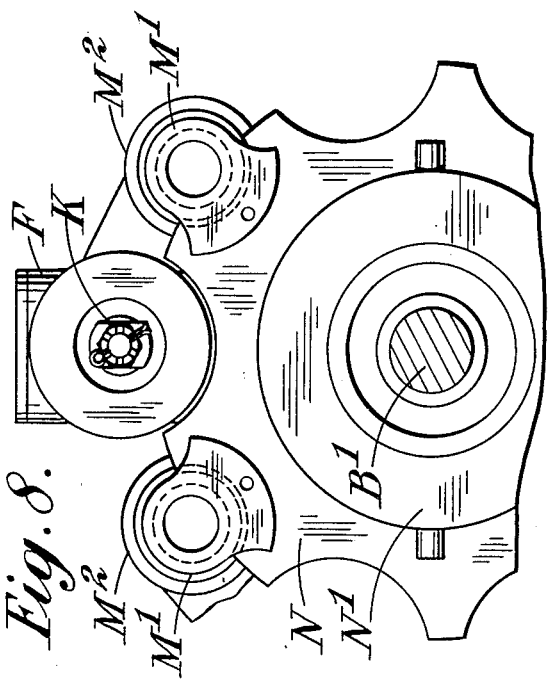
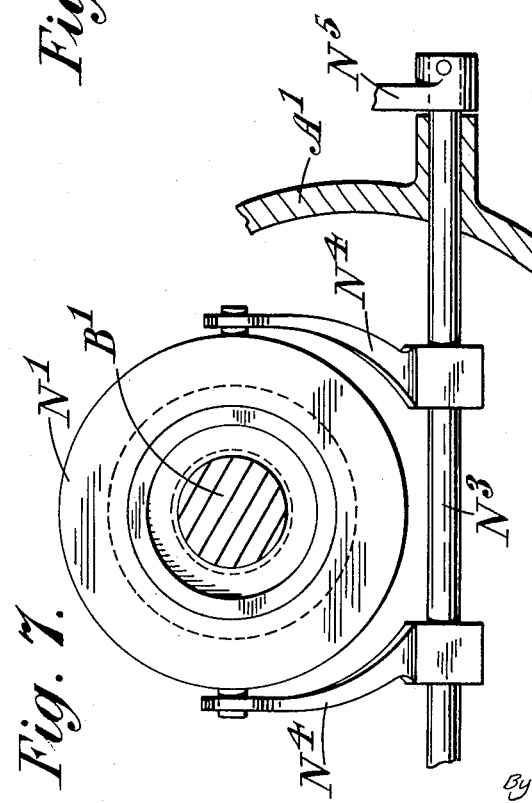
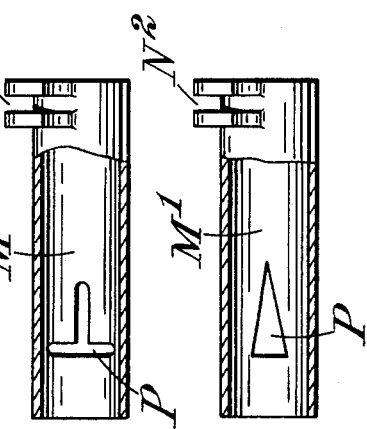

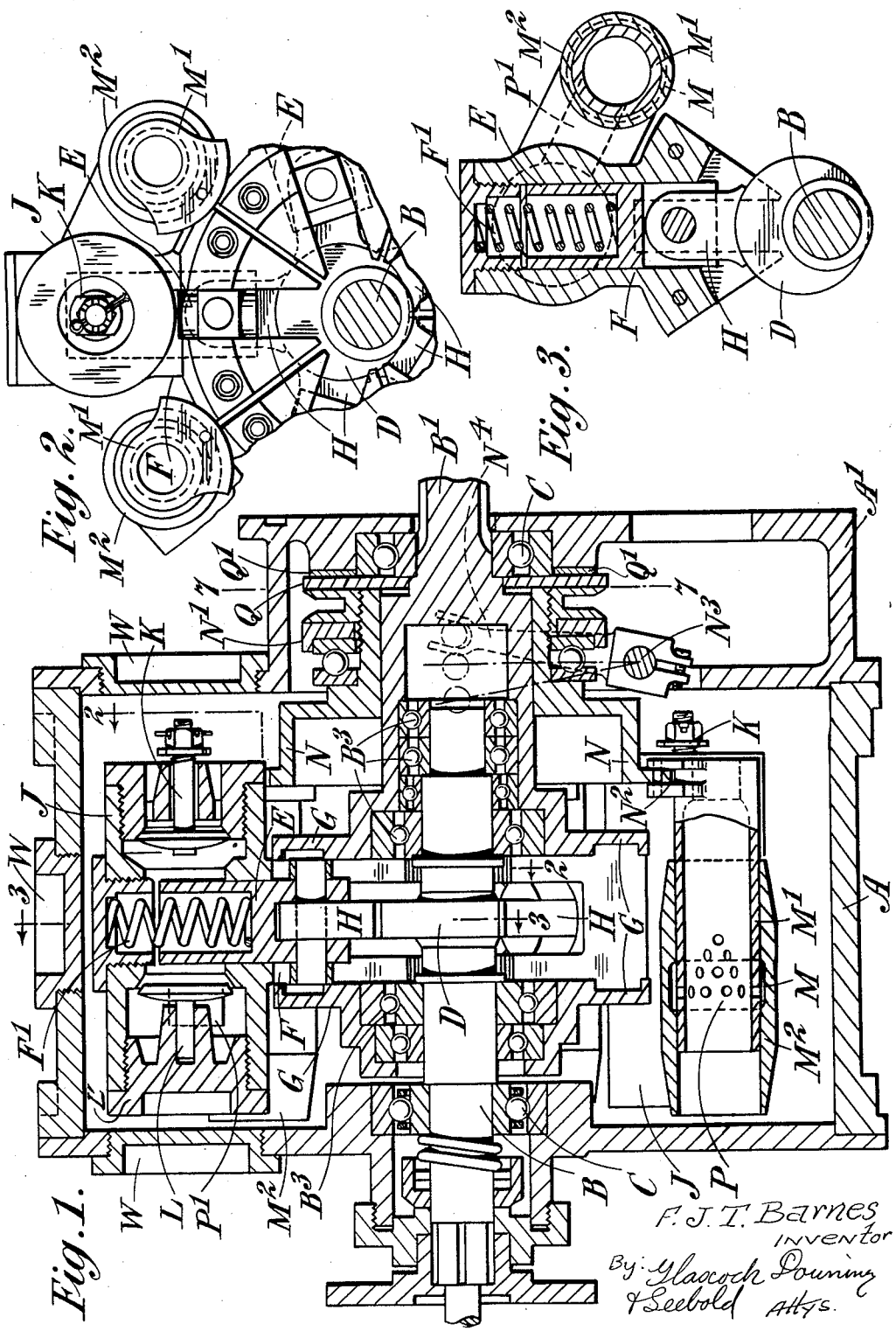

Patented July 13, 1937

2,086,519

UNITED STATES PATENT OFFICE 2,086,519

VARIABLE HYDRAULIC POWER TRANSMISSION DEVICE

Frederick John Trevallon Barnes, Brisbane, Australia

Application June 22, 1933, Serial No. 677,177
In Australia July 18, 1932

2 Claims. (Cl. 192—60)

This invention relates to a power transmission device and more particularly to a power transmission device for use in connection with motor vehicles.

The object of the invention is to provide a device which is silent in operation and which may transmit power at any desired number of revolutions, the change from high to low speed and vice versa being very easily and silently effected merely by the operation of a lever.

Figure 1 is a longitudinal sectional elevation of the transmission section and control section of the device.

Figure 2 is a part end elevation on the line 2—2 of Figure 1.

Figure 3 is a sectional elevation on the line 3—3 of Figure 1.

Figure 4 is a detail view partly in section of the valve casing.

Figures 5 and 6 show modified constructions of the control valve.

Figure 7 is a part sectional end elevation on the line 7—7.

Figure 8 is an end elevation of the control section.

The casing is divided into two sections, viz. section A in which is housed the variable transmission device and section $A^1$ in which is housed the control device.

Mounted in the casing A, $A^1$ in suitable bearing C are a driving shaft B and a driven shaft $B^1$, the adjacent ends of which are arranged to support each other, bearings $B^3$ being provided to reduce friction. It will be understood that the bearings C and $B^3$ may be of the ball or roller type.

An eccentric or cam D or crank is secured to the driving shaft B and is adapted to operate by means of swash blocks H, rollers or the like, a number of pistons E working in cylinders F arranged radially about the shaft B and secured together by housings G one of which is formed integrally with or secured to the driven shaft $B^1$. Recoil springs $F^1$ are provided in the cylinders F behind the pistons E to assist in keeping the swash blocks H, rollers, or other similar device carried by the pistons E against the eccentric or cam D or crank and take up any slack consequent on wear of the parts.

Each cylinder F is formed with a valve casing J at its upper end in which are an inlet valve K and outlet valve L. The inlet valve K opens on the inward stroke of the pistons E to the chamber within the casing A, $A^1$. The outlet valve L, which is in the enclosed end $L^1$ of the casing J, opens on the return stroke of the piston E to an annular control valve chamber M formed in casing $M^2$ surrounding a tubular control valve $M^1$, which latter is moved back and forth as desired in the casing $M^2$ by a flanged spider or sliding control plate N, which engages in a groove $N^2$ in the control valves $M^1$ and which is operated by thrust ring $N^1$, fork $N^4$, and operating lever $N^5$ fitted on the shaft $N^3$ outside section $A^1$ of the casing. A graduated port P is provided in the valve $M^1$ and the position thereof in relation to the port $P^1$ in the valve casing, according to the movement of the valve $M^1$, regulates the flow through the latter, through the valve chamber M, and into and out of the cylinders F. The graduated port P may be T shaped as shown in Fig. 5 or V shaped as shown in Fig. 6 or it may consist of a number of holes suitably placed or of suitable diameters so that the area of the passage may be gradually opened as the valve is moved.

The friction brake ring Q, which is placed between the thrust ring $N^1$ and friction plate $Q^1$, is provided for braking section $B^1$ of the shaft when not being driven.

The metals and materials of which the various parts are made would be those best suited for the various purposes. The constructional details would be as found most effective and could be varied so long as the essential features of the invention are retained. Plugs W would be provided where required for inspection, adjusting and cleaning purposes. Seal rings, glands, or other means are used where necessary for preventing leakage.

The casings, cylinders, valve chambers and tubular valves are all filled with oil and in the operation of the device such oil is circulated through the inlet and outlet valves, the circulation of the oil and consequently the speed of rotation of the driven shaft being controlled by the position of the control valve.

The operation of the power transmission device according to the invention is as follows. When the device is running free, i. e. when the driven shaft $B^1$ is stationary, the widest portion of the port P is opposite the annular chamber M and consequently there is a maximum flow of oil through the cylinders F. On moving the control valve $M^1$ by means of lever $N^5$ so that less oil flows through the cylinders F, i. e. so that the area of the port P coincident with the annular chamber M is decreased, the piston and cylinder system commences to rotate, and thus the shaft $B^1$ is driven. When the valve $M^1$ is in such a position that no oil can flow through the cylinders F, the driven shaft B¹ rotates at the same rate as the driving shaft B.

The pressure of the oil on the pistons in all cylinders is always constant and balanced and any oil which passes through the bearings to within the housings G exerts a similar equal pressure on the inner end of the pistons E. Furthermore, the arrangement of tubular valve M¹ and annular chamber M is such that there is always an equal pressure on the outside and inside of the valve, consequently it is very easy to operate the valve to control the speed of the driven shaft.

The arrangement is such that a free engine is provided at will or an automatic slowing down of the engine is caused when the engine ceases to be accelerated and when the impetus of the vehicle imposes a driving force to turn the engine, the engine speed being thus reduced.

What I claim is:

1. A variable hydraulic power transmission device including a casing, a driving shaft and a driven shaft, said shafts running in bearings in the casing and supporting each other, cylinders radially arranged within the casing and secured to one shaft, pistons working in the cylinders and operated from the other shaft, a valve casing connected to each of the cylinders, inlet and outlet valves in the valve casing, said valves being disposed parallel to the axis of the shafts, control valve casings, each control valve casing being provided internally with an annular chamber connected to a valve casing, a control valve having a graduated port within each control valve casing, and means for moving said control valve to place the graduated port into and out of coincidence with the annular chamber.

2. A variable hydraulic power transmission device having a casing, a driving shaft and a driven shaft, said shafts running in bearings in the casing and supporting each other, a cylinder radially disposed in the casing and connected to one of said shafts, and said cylinder having inlet and outlet valves, a piston working in the cylinder and connected to the other of said shafts, a control valve casing having a port in the form of an annular internal groove and an external conduit connecting the groove to the cylinder, a tubular valve provided with a graduated port and sliding in the control valve casing and a control member engaging the tubular member, said control member reciprocating the tubular valve within the control valve casing to vary the coincidence of the graduated port and the port formed in said casing.

FREDERICK JOHN TREVALLON BARNES.